Aug. 12, 1958    T. W. KALBOW    2,846,682
DEVICE FOR HOLDING A COMPOSITE ARTICLE
IN DIFFERENT POSITIONS
Filed Nov. 9, 1956    3 Sheets-Sheet 3
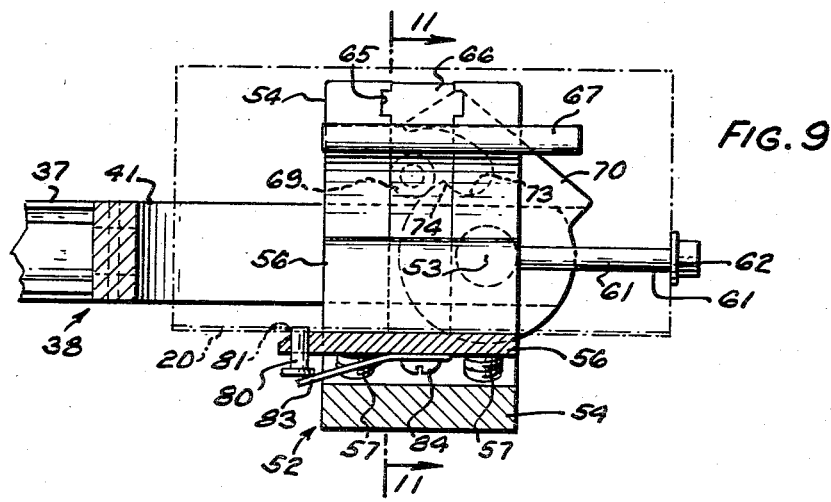
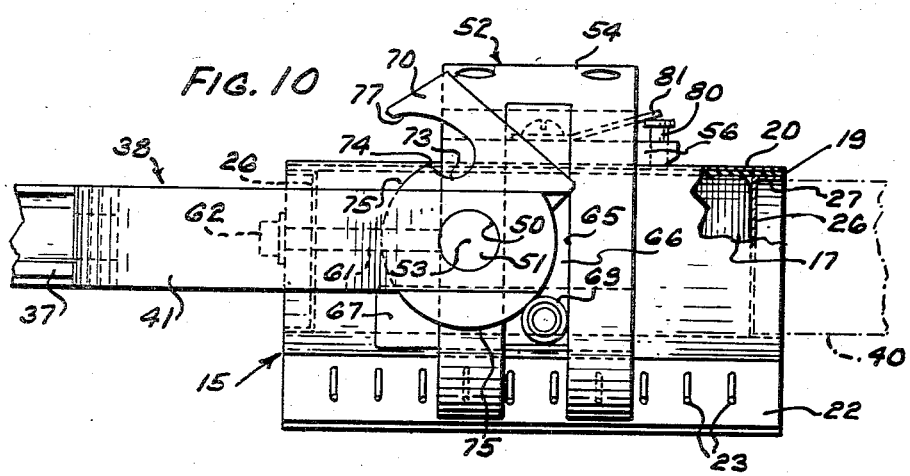
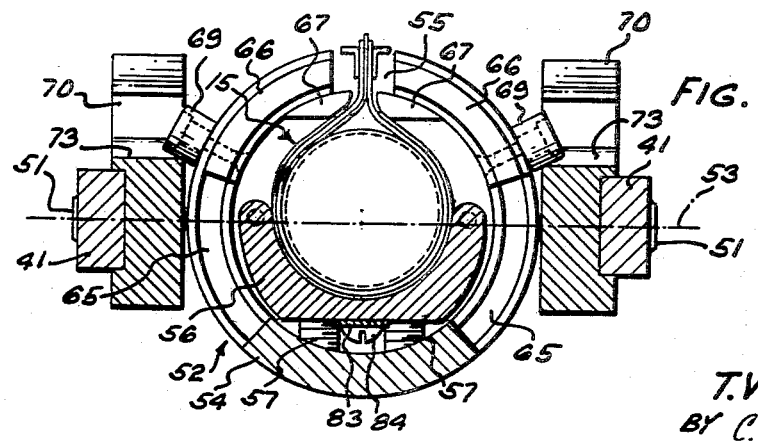
INVENTOR
T. W. KALBOW
BY C. B. Hamilton
ATTORNEY

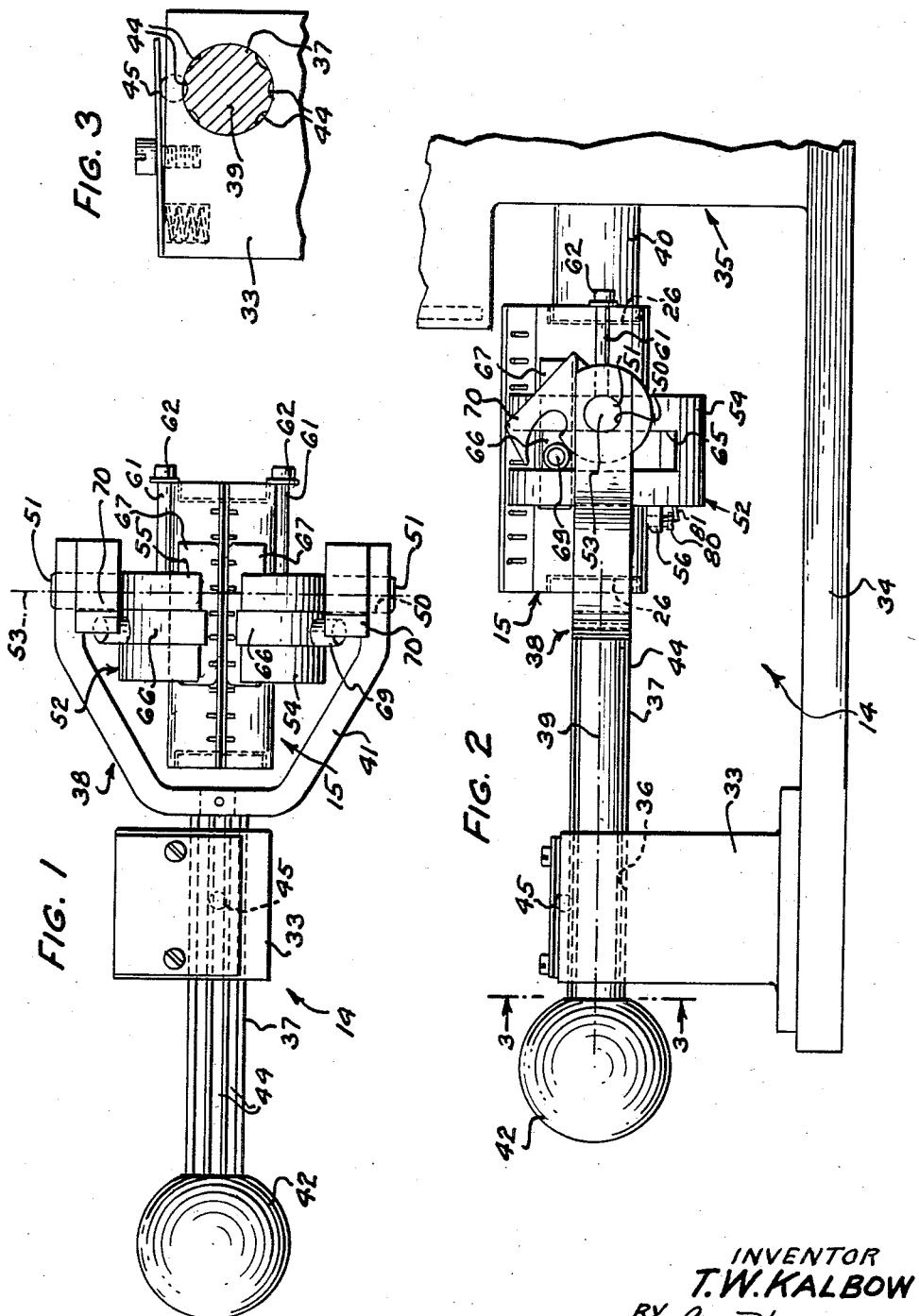

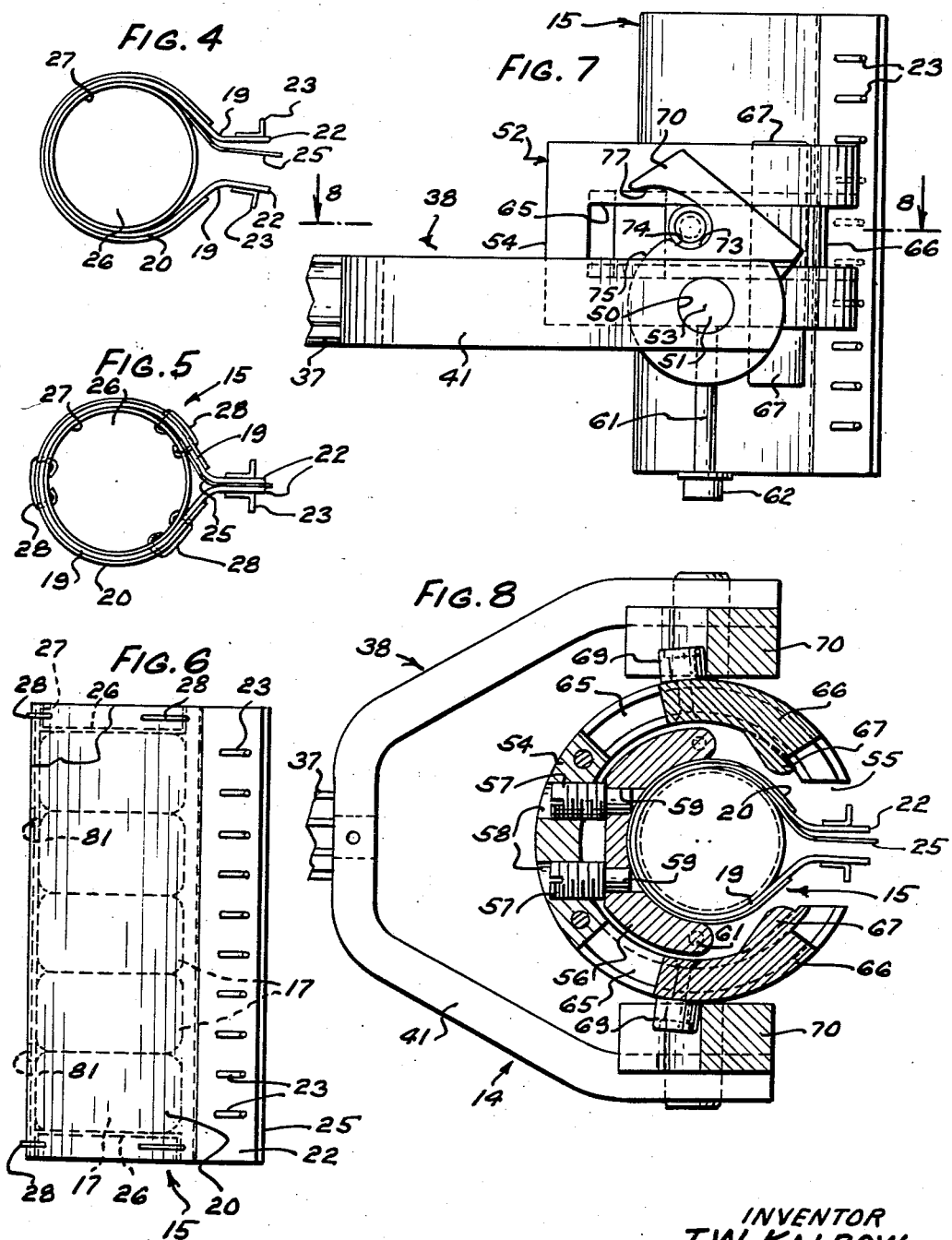

United States Patent Office 2,846,682
Patented Aug. 12, 1958

2,846,682

DEVICE FOR HOLDING A COMPOSITE ARTICLE IN DIFFERENT POSITIONS

Theodore W. Kalbow, Chicago, Ill., assignor to Western Electric Company, Incorporated, New York, N. Y., a corporation of New York Application November 9, 1956, Serial No. 621,330

5 Claims. (Cl. 1—128)

This invention relates to a device for holding a composite article in different positions while it is being worked on and more particularly to a fixture for clamping a split cylindrical casing around an article and for holding the assembly in different positions while closures are stapled to the casing.

An object of the invention is to provide a fixture for supporting a composite article for movement into various positions while it is being worked on.

Another object of the invention is to provide a device for clamping a split cylindrical casing around an article and for moving the assembled article to and supporting it in various positions while end closures are secured thereto.

A device illustrating certain features of the invention may include a carrier supported for rotation about a predetermined longitudinal axis in alignment with an anvil of a stapling machine and for movement in an axial direction to and from the anvil, and a C-shaped cylindrical holder supported on the carrier for rotation about a second axis transversely of the longitudinal axis. A pair of clamping jaws which are mounted on the holder are actuated to open position by cams on the carrier when the holder is rotated to a substantially vertical position to permit an article with a cylindrical split shell loosely wrapped around it to be slid into the holder and flanged end closures inserted in the ends thereof, whereupon the holder may be rotated in one direction about the transverse axis to dispose the shell in substantial coaxial alignment with the longitudinal axis and the anvil and to cause the cams on the carrier to move the jaws to closed position and tightly clamp the cylindrical split shell about the article. The carrier is then advanced along the longitudinal axis to move one end of the assembly into engagement with the anvil and the stapling machine is actuated and the carrier is turned about the longitudinal axis into various positions to effect the stapling of the end closure to the shell, after which the carrier is retracted and the holder is rotated about the transverse axis through one half revolution to dispose the other end of the assembly toward the stapling machine, whereupon the carrier is again advanced and rotated to several different positions and the stapling machine is actuated to staple the second closure to the shell.

Other objects and dvantages of the invention will become apparent by reference to the following detailed description and the accompanying drawings illustrating a preferred embodiment thereof, in which:

Fig. 1 is a plan view of the device for moving and supporting the article in various positions and showing the carrier of the device in retracted position;

Fig. 2 is a side elevational view of the device shown in Fig. 1 and showing the carrier in its advanced position with the article in engagement with a stapling machine;

Fig. 3 is a detailed sectional view of the device taken on line 3—3 of Fig. 2;

Fig. 4 is an end view of the composite article showing the components before they are stapled together;

Fig. 5 is an end view of the composite article after the components have been stapled together;

Fig. 6 is a side view of the composite article shown in Fig. 5;

Fig. 7 is an enlarged fragmentary side elevational view of the device showing the article holder in vertical position with the article therein and with the clamping jaws in open position;

Fig. 8 is a fragmentary plan sectional view taken on line 8—8 of Fig. 7;

Fig. 9 is a fragmentary vertical longitudinal sectional view of the device showing the article holder in a horizontal position with clamping jaws in closed position and indicating the article therein in dot and dash lines;

Fig. 10 is a fragmentary side elevational view of the device showing the holder rotated through 180° from the position shown in Fig. 9 and showing the article in operative position relative to the stapling machine; and Fig. 11 is a vertical cross-sectional view through the device taken on line 11—11 of Fig. 9.

The present device 14 is designed to firmly grip and support the components of a composite article or coil assembly 15 (Figs. 4–6) in assembled relation while some of the components are being secured together. The coil assembly shown herein includes a row of toroidal coils 17 disposed within a cylindrical liner sheet 19 of fiber or other dielectric material and a split cylindrical sheet metal shell 20. The longitudinal marginal portions 22 of the liner sheet 19 extend outwardly from between the ends of the shell 20 and have terminals 23 secured thereto to which the leads of the toroidal coil 17 are secured and a separate strip 25 of dielectric material is inserted between the marginal portions 22 to maintain the terminals in insulated relation to each other. Sheet metal end closures 26 in the form of discs having cylindrical flanges 27 are inserted in the end of the coil assembly and are fastened to the shell 20 by a plurality of staples 28, the legs of which pass through the shell 20 and the flanges 27 of the end closures 26 to secure the components in assembled relation.

The device 14 comprises a supporting bracket or standard 33 (Fig. 2) secured to a bench 34 on which is mounted a machine 35 for stapling the closures 26 to the shell 20 of the coil assembly. The supporting bracket 33 has a horizontal bore 36 for supporting a shaft 37 of a carrier 38 for rotation about a horizontal longitudinal axis 39 in alignment with an anvil 40 of the stapling machine 35 and for axial movement toward and away from the anvil. The carrier has a yoke 41 mounted on one end of the shaft 37 and a handle 42 secured on the other end thereof for imparting axial and rotary movement to the carrier. The shaft 37 has a plurality of longitudinal grooves 44 disposed in predetermined angular relation to each other for cooperation with a spring pressed detent 45 on the bracket 33 for yieldably retaining the carrier 38 in its adjusted angular position.

The arms of the yoke 41 are provided with bearing apertures 50 for receiving a pair of trunnions 51 on a holder 52 for supporting the holder for rotation about a second axis 53 at right angles to the longitudinal axis of rotation of the carrier. The holder 52 includes a C-shaped ring-like frame 54 having an axially directed slot 55. A curved plate or seat 56 for supporting the coil assembly 15 thereon is adjustably mounted within the frame 54 by a plurality of screws 57 threaded in threaded apertures 58 in the frame 54 and having reduced ends 59 rotatable in apertures in the seat 56. A pair of rods 61 extend from the seat 55 in an axial direction and have heads 62 for engaging the end of the coil assembly 15 and the closure plates 26 to locate them in a predetermined position on the holder 52. Intermediate the ends of the holder 52 the opposite walls of the frame 54 thereof are slotted to provide arcuate guideways 65 for receiving arcuate slides 66 therein. These slides have axially directed jaws 67 thereon for engaging the marginal portions of the shell 20 and the liner strip 19 tightly about the coils and the end closures 26. The arcuate slides 66 have cam rollers 69 thereon which cooperate with cams 70 mounted on the arms of the yoke 41 for actuating the slides 66 and the jaws 67 to and from a closed position shown in Fig. 11 in response to angular movement of the holder 52 about the transverse axis 53. The slides 66 and the jaws 67 thereon are moved to their open position by the cams 70 when the holder 52 is turned about the transverse axis to a substantially vertical position as shown in Figs. 7 and 8, with the positioning pins 61 directed downwardly, and a coil assembly 15 may be moved axially into position therein with the lower end of the assembly 15 engaging the heads 62 of the positioning pins 61 and being supported thereby.

With the holder 52 in this vertical open position the cam rollers 69 on the slides 66 are disposed in the recessed portions 73 of the cams 70, and in response to a turning movement of the holder in a counterclockwise direction as viewed in Fig. 7 the jaws 67 will be moved to their closed position as the rollers 69 ride up the inclined surfaces 74 on the cams 70 and engage the circular cam surfaces 75 concentric with the transverse axis 53 and are held by the cam surfaces 75 is closed position. The movement of the jaws 67 from their open position (Fig. 7) to their closed position occurs during an angular movement in a counterclockwise direction as viewed in Fig. 7 of approximately 45° from the vertical so that the jaws 67 are in their closed position when the holder is moved to its horizontal position as shown in Fig. 9 with the coil assembly in coaxial alignment with the longitudinal axis 39 and with the anvil 40 of the stapling machine. The handle 42 of the carrier 38 is then engaged by the operator and advanced to move the end of the coil assembly 15 into engagement with the anvil 40 and the handle 42 is turned to rotate the carrier 38, the holder 52 and the coil assembly 15 to a predetermined angular position in which it is yieldably held by the spring pressed detent 45. The stitching machine 36 is then actuated to drive a staple 28 through the end of the shell 20, the liner 19, and the flange 27 of the closure 26. The handle 42 is then successively turned to dispose the coil assembly in two other predetermined positions and the stapling machine is actuated each time to drive the other two staples 28 to securely staple the closure 26 to the shell 20.

The carrier 38 is then returned to the position shown in Fig. 9 after which the holder 52 is rotated 180° about the transverse axis 53 to the position shown in Fig. 10 with the coil assembly coaxially aligned with the longitudinal axis and with the other end of the coil assembly directed toward the anvil 40 of the stapling machine, after which the carrier is advanced to move this end of the coil assembly into operative position in engagement with the anvil as shown in Fig. 10. The carrier 38 is then successively turned about the longitudinal axis 39 to predetermined positions and yieldably retained therein by the detent 45 and the stapling machine 35 is actuated to drive a set of three staples 28 through the liner 19, the shell 20, and the flange 27 of the second closure 26. The carrier 38 is then moved to its retracted position and the holder 52 is rotated 270° about the transverse axis 53 in a clockwise direction as viewed in Fig. 10 to the position shown in Fig. 7. As the holder approaches the vertical position shown in Fig. 7 the cam rollers 69 are engaged by the curved cam surfaces 77 of the cams 70 and are actuated thereby to move the slides 66 and the jaws 67 to their open position as shown in Fig. 8, in which position of the device the completely assembled and stapled coil assembly 15 may be removed from the holder.

In order to aid in angularly aligning the coil assembly in the holder a headed pin 80 (Fig. 9) is mounted in an aperture along the centerline of the curved seat 56 for engaging in one of a pair of apertures 81 formed in the shell 20 along the centerline thereof. The pin 80 is urged for movement into engagement with the aperture 81 in the shell by a leaf spring 83 secured to the seat 55 by a screw 84.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for supporting an article in different positions comprising a hollow longitudinally slotted cylindrical holder for holding a cylindrical slotted article, a pair of jaws mounted on said holder for circumferential movement toward and away from each other and the slot therein to engage the marginal portions of the slotted article, means for supporting said holder for rotation about an axis transversely of a longitudinal axis through said holder, and cam means on said supporting means for actuating said jaws from open to closed position in response to a predetermined turning movement of the holder about said transverse axis.

2. A device for supporting an article in different positions comprising a hollow longitudinally slotted cylindrical holder for holding a cylindrical slotted article, a pair of jaws mounted on said holder for circumferential movement toward and away from each other and the slot therein to engage the marginal portions of the slotted article, means for supporting said holder for rotation about an axis transversely of a longitudinal axis through said holder, and cam means on said supporting means having surfaces for actuating said jaws simultaneously from open to closed positions in response to turning movement of the holder about said transverse axis through a predetermined angle and having surfaces for maintaining said jaws in closed position during movement of the holder through a predetermined different angle.

3. In a device for supporting a composite article while components of the article are being secured together by a machine, a carrier, means for mounting the carrier for oscillatable movement about a first axis in alignment with the machine and for movement in an axial direction toward and away from the machine, a holder supported by the carrier for rotation about a second axis disposed transversely of the first axis for supporting the article therein, a pair of jaws slidably mounted on the holder for circumferential movement from an open position to a closed position for holding the article on the holder, cam means on the carrier for actuating the jaws simultaneously to and from an open and closed positions in response to rotation through a predetermined angular movement of the holder about the second axis, and means for holding the jaws closed during rotation of the holder through an angular distance of at least one-half revolution to permit the holder and the article to be rotated about the second axis to position opposite ends of the article toward the machine for movement into engagement therewith.

4. In a device for supporting a composite cylindrical article including a slotted cylindrical shell while components of the article are being secured together by a machine, a carrier, means for mounting the carrier for oscillatable movement about a first axis in alignment with the machine and for movement in an axial direction toward and away from the machine, a hollow longitudinally slotted cylindrical holder for holding the composite article, means on the holder engageable with one end of the article to locate it in a predetermined position on the holder with the ends thereof extending beyond the holder, means for supporting the holder on the carrier for rotation therewith about the first axis and for rotation relative to the carrier about a second axis transversely of the first axis, a pair of jaws slidably mounted on the holder for circumferential movement from an open position to a closed position for engaging the marginal portion of the slotted shell and holding the composite article on the holder, cam means on the carrier for actuating the jaws simultaneously to and from an open position in response to rotation of the holder through a predetermined angular movement about the second axis, and means for holding the jaws closed during rotation of the holder through an angular distance of at least one-half revolution to permit the holder and the composite article to be rotated about the second axis to position opposite ends of the article toward the machine for movement into engagement therewith.

5. In an apparatus for stapling end components of a composite article to a slotted tubular component having longitudinal flanges wherein the apparatus has a base and stapling means including an anvil engageable with the end components, the combination therewith of a carrier, means on said base for supporting said carrier for longitudinal movement toward and from the anvil along a first axis aligned with the anvil and for rotation about said axis, a circular holder for supporting the composite article with the ends thereof extending beyond the holder, said holder having a longitudinal slot for receiving the longitudinal flanges of the tubular component, means for mounting the holder on the carrier for rotation about a second axis perpendicular to said first axis and in a plane through said first axis, said holder being movable to an operative position for supporting the article in coaxial alignment with the first axis and to a loading position transversely of said first axis, a pair of jaws mounted on said holder for circumferential movement thereon, and cam means on said carrier for moving said jaws to an open position in response to movement of the holder to said loading position to permit loading of a composite article therein and for moving said jaws to closed position adjacent the slot in response to movement of the holder to said operative position for securing the article to the holder, said cam means being operable to maintain the jaws in closed position during the movement of the holder and the article therein about the second axis through at least one-half revolution to permit the article to be positioned with either end thereof directed toward the anvil, and a handle on the carrier for imparting axial and rotary movements thereto.

References Cited in the file of this patent
UNITED STATES PATENTS

| | | |
|---|---|---|
| 663,601 | Degelman | Dec. 11, 1900 |
| 700,021 | Dithridge | May 13, 1902 |
| 2,356,698 | Roitz | Aug. 22, 1944 |
| 2,495,438 | Bentley et al. | Jan. 24, 1950 |
| 2,598,529 | Fritz | May 27, 1952 |